United States Patent [19]

Ishida et al.

[11] Patent Number: 4,457,611
[45] Date of Patent: Jul. 3, 1984

[54] PHOTOGRAPHIC SYSTEM FOR USE IN FLASH PHOTOGRAPHY WITH A CAMERA

[75] Inventors: Tokuji Ishida, Daito; Hiroshi Hosomiyu, Sakai; both of Japan

[73] Assignee: Minolta Camera Kabushiki Kaisha, Osaka, Japan

[21] Appl. No.: 416,128

[22] Filed: Sep. 9, 1982

[30] Foreign Application Priority Data

Sep. 11, 1981 [JP] Japan ................. 56-144308

[51] Int. Cl.³ .............................................. G03B 7/16
[52] U.S. Cl. ................................ 354/415; 354/446
[58] Field of Search ............... 354/33, 34, 41, 42, 354/43, 60 F, 415, 446

[56] References Cited

U.S. PATENT DOCUMENTS 4,305,647  12/1981  Ishida ............................ 354/33
4,316,659  2/1982  Daniels .......................... 354/42
4,327,978  5/1982  Ishida et al. ................... 354/41

FOREIGN PATENT DOCUMENTS 5675627  6/1981  Japan .

Primary Examiner—Michael L. Gellner
Attorney, Agent, or Firm—Watson, Cole, Grindle & Watson

[57] ABSTRACT

A photographic system for use in flash photography with a camera is disclosed. The system is constructed to emit a preliminary flash light of infrared light component in advance of a main flash light emission of visible light component for flash photography in order that the preliminary flash light emission does not stimulate a human eye. The preliminary flash light is used for controlling an exposure of the camera such as an aperture of diaphragm.

38 Claims, 6 Drawing Figures

PHOTOGRAPHIC SYSTEM FOR USE IN FLASH PHOTOGRAPHY WITH A CAMERA

BACKGROUND OF THE INVENTION

1. Field of the Invention

The present invention relates to a photographic system for use in flash photography with a camera.

2. Description of the Prior Art

There are a variety of conventional electronic flash devices designed to emit a preliminary flash light in advance of the main light emission for flash photography and also a variety of exposure control systems for flash photography which make use of the preliminary flash light emission for camera exposure control, for example, the control of the diaphragm aperture of a camera objective lens. As an example, a Japanese Laid-Open patent application TOKKAISHO 56-75627 discloses an electronic flash device which includes: a first capacitor for the preliminary flash light emission, a second capacitor and a single Xenon tube, and which is arranged to effect the preliminary flash light emission by firing of the Xenon tube with a discharge of the electric energy stored in the first capacitor through the Xenon tube, and then effects a main flash light emission by firing of said Xenon tube again with a discharge of the electric energy stored in the second capacitor through the Xenon tube. Since the light emitted from the Xenon tube includes visible light, the electronic flashing device as described above may cause the person being photographed, to unconsciously blink with his eyes due to the stimulation of the eyes by the preliminary flash light. This blink sometimes occurs a short time after the preliminary flash light emission and just at the time when the exposure is effected with the main flash light being emitted, resulting in an unfavourable picture of the photographed person with his or her eyes looking about to close.

SUMMARY OF THE INVENTION

An object of the present invention is to provide a photographic system for use in flash photography with a camera having a function of preliminary flash light emission but which does not stimulate the eyes of a person being photographed, thereby avoiding an unfavourable picture being taken wherein the photographed person looks as if he or she is closing his or her eyes.

To attain these objects, the photographic system according to the present invention includes a couple of flash light emitting means for the preliminary and main flash light emission respectively, and an optical filter disposed in front of one of the flash light emitting means for the preliminary light and which cuts off the visible light rays and transmits the infrared light rays so that only the infrared rays are emitted for the preliminary light, and the electronic flash device is arranged to fire both flash tubes with electric energy stored in a common storage means.

Furthermore, the photography system for flash photography according to the present invention is characterized by an arrangement wherein a light receiving means receives, through a camera objective, infrared rays emitted as the preliminary flash light and reflected from an object being photographed, and the diaphragm aperture of the camera objective is stopped during its stopping-down operation when the amount of received rays reached a given level.

DETAILED DESCRIPTION OF THE INVENTION

Figure 1:
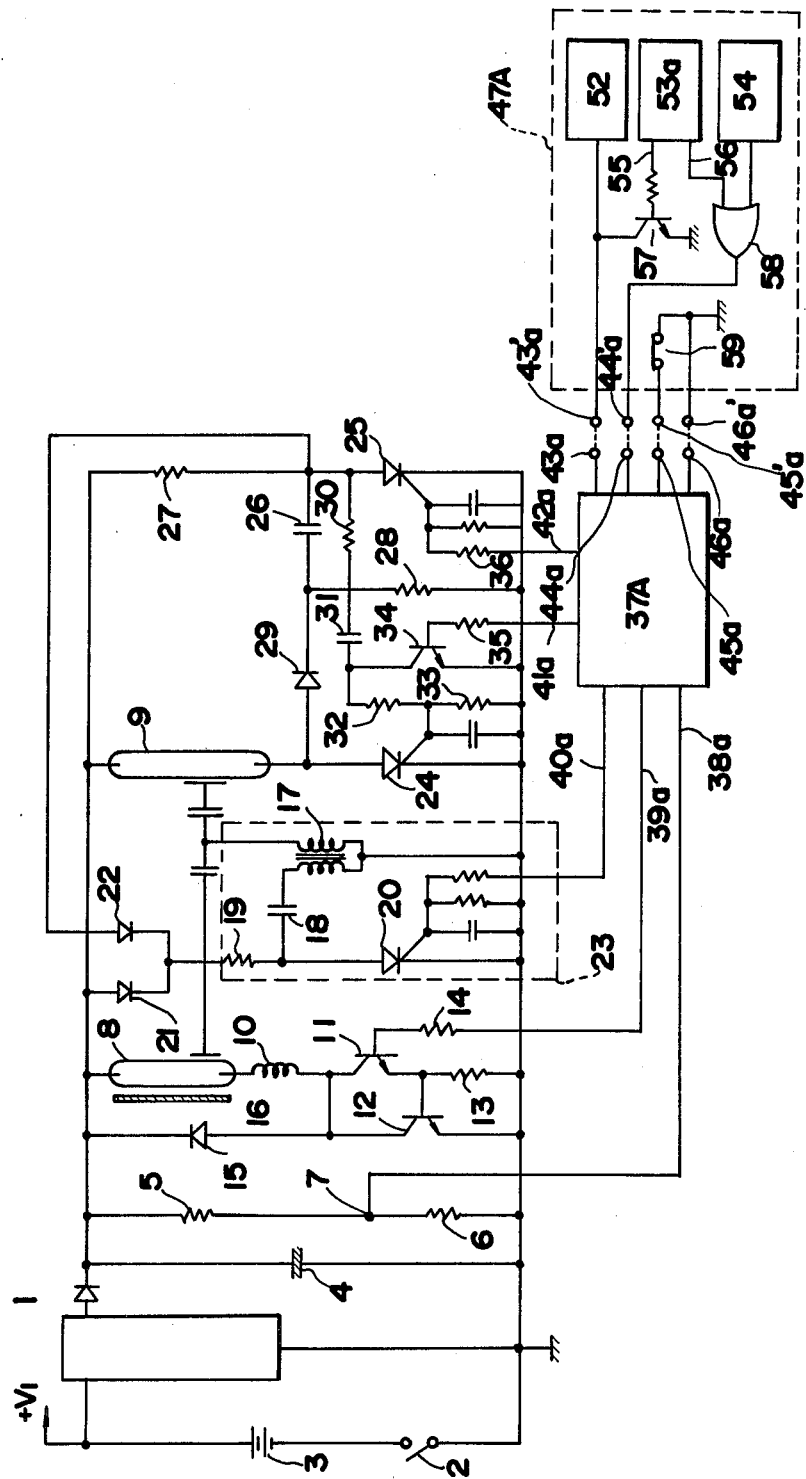
FIG. 1 is a circuit diagram of an electronic flash device according to an embodiment of the present invention.

FIG. 1 is a circuit diagram showing an embodiment of an electronic flash device according to the present invention. With reference to FIG. 1, block 1 repesents a conventional booster circuit which, with the closure of power switch 2, converts the voltage of power source battery 3 to a DC voltage of a high level, for example, 300 V. Main capacitor 4 is charged to the boosted high voltage, to be ready for the preliminary and main flash light emission. Series connected resistors 5 and 6 form a voltage divider circuit for dividing the charged voltage of the main capacitor 4 and the divided voltage derived from junction 7 is applied to the control circuit 37A which will be described later, to monitor the charging condition of main capacitor 4. Auxiliary flash tube 8 which is composed of a Xenon discharge tube the same as main flash tube 9, makes up a preliminary flash device for emitting a substantially constant intensity light for a given period, along with coil 10, transistors 11 and 12, resistors 13 and 14 and a diode 15.

Figure 6:
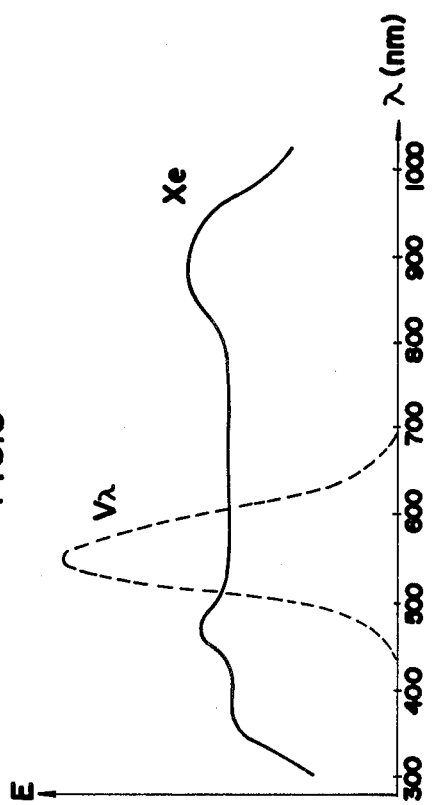
FIG. 6 is a graph showing the spectral distribution of the light emitted from a Xenon tube.

Curve Xe in the graph of FIG. 6 represents the general spectral distribution of the light emitted from a Xenon discharge tube. As is obvious from FIG. 6, the Xenon discharge tube emits light which has a flat spectral distribution throughout the range of wave-length that is wider than that of the relative visibility curve (V). Of the spectral distribution of light emitted from the Xenon discharge tube, the present invention is intended to use, for the preliminary light, the infrared component of the light emitted from the Xenon discharge tube.

Figure 2:
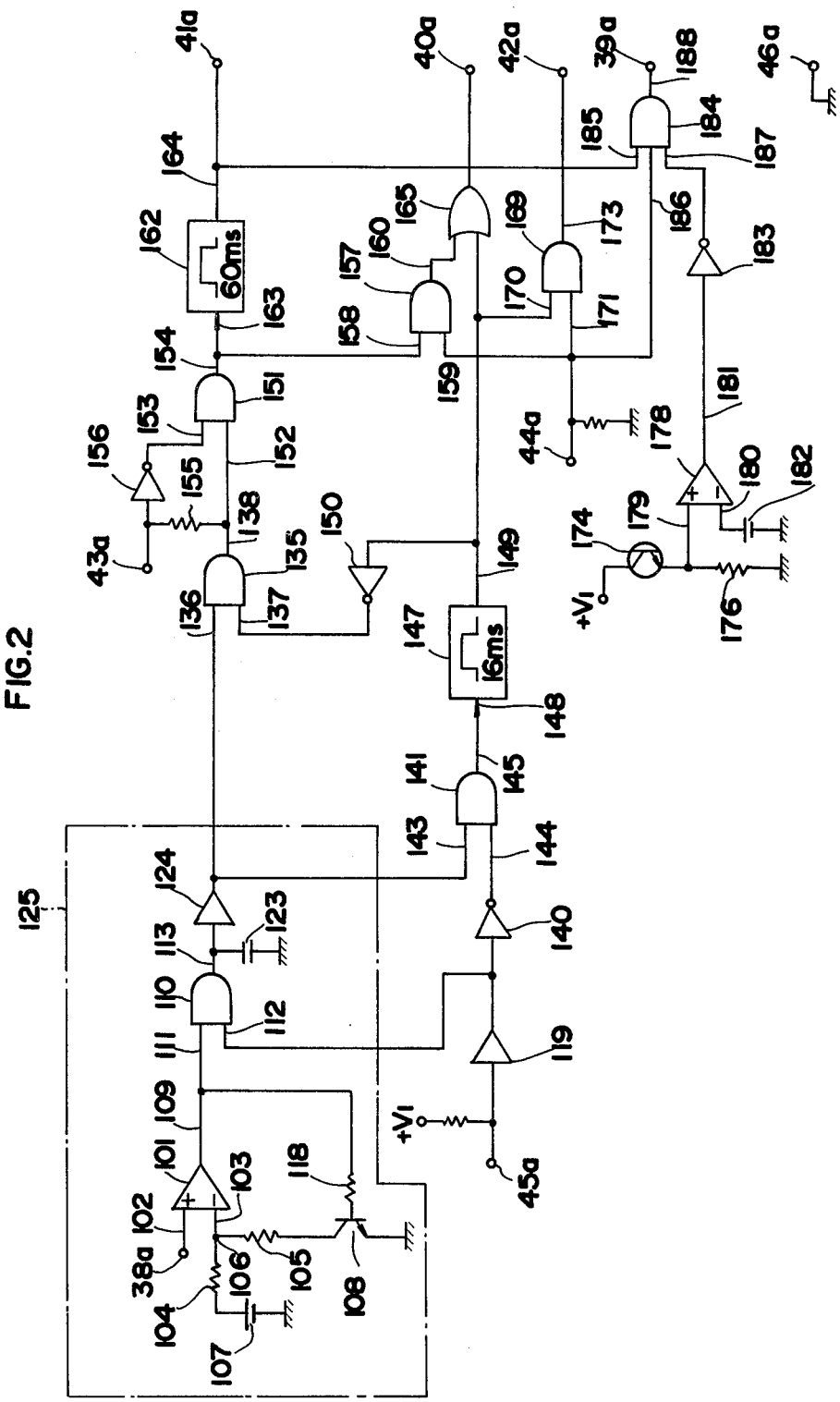
FIG. 2 is a circuit diagram showing a definite circuit construction of the control circuit (37A) in FIG. 1.

In front of preliminary flash tube 8 is disposed filter 16 which cuts off visible light and allows infrared light to pass therethrough. The base of transistor 11 is connected to control circuit 37A through resistor 14 to turn on and off transistor 11 repeatedly at such a high speed that the intensity of the light emitted from auxiliary flash tube 8 may be considered as constant in view of the order of the time period required for diaphragm control. A circuit 23 comprising trigger transformer 17, capacitor 18, resistor 19 and thyristor 20 forms a trigger circuit for triggering the preliminary and main flash tubes 8 and 9. When thyristor 20 turns ON, the charge previously stored through diodes 21 and 22 in capacitor 18 is discharged to trigger flash tube 8 or 9. When preliminary flash tube 8 is fired, thyristor 24 connected in series with main flash tube 9 remains OFF, while transistors 11 and 12 connected in series with preliminary flash tube 8 are left ON. When trigger circuit 23 is activated under this condition, preliminary flash tube 8 starts to emit light. Upon triggering flash tube 8, thyristor 20 receives at its gate a pulse of a very short duration, for example, 1 milli-second, so that the thyristor 20 turns ON for a very short time and then immediately turns OFF. When trigger circuit 23 is activated, the trigger voltage is also applied to the main flash tube 9 at the same time, so that the internal resistance of main flash tube 9 lowers, causing the anode potential of thyristor 24 to rise. As a result of this potential rise, a part of the charge previously stored in capacitor 26 flows through diode 22 and resistor 19 into trigger capacitor 18 which is recharged quickly and sufficiently for the preparation of the triggering of main flash tube 9. Thyristors 24 and 25, capacitor 26, resistors 27 and 28 and diode 29 form a well-known stop circuit for cutting off the firing of main flash tube 9. Parallel with thyristor 25 is connected a series connection of resistor 30, capacitor 31 and resistors 32 and 33 which connection forms a circuit for rendering thyristor 24 conductive for the firing of main flash tube 9, and through which connection the potential rise at the anode of thyristor 24 because of activation of trigger circuit 23 is transmitted to the gate of thyristor 24 to turn ON the thyristor 24. It is to be understood that, during the preliminary flash light emission, transistor 34 is made conductive to ground the gate of thyristor 24 for making the thyristor 24 nonconductive, thereby preventing the firing of main flash tube 9. The portion of the circuit described above is controlled by the control signals from control circuit 37A, of which the circuit schematic is shown in FIG. 2.

Before the detailed description of control circuit 37A, an explanation is given about an electric circuit of a camera which is to be associated or combined with the electronic flash device according to the present invention. With reference to FIG. 1, the portion 47A enclosed by a broken line is a camera circuit which is coupled with control circuit 37A of the electronic flash device through four external terminals 43'a, 44'a, 45'a and 46'a which are provided on the accessary shoe of the camera for receiving a portion e.g. accessary foot of an electronic flash device. Terminals 45'a and 46'a are positioned to be connected with synchro terminals of other conventional electronic flash devices which are adapted to be connected with a synchro switch in the camera. When shutter release is commanded to camera circuit 47A, a single pulse of a duration, for example, of 1 millisecond is produced at terminal 55 of signal generator circuit 53a. During the duration of the pulse, transistor 57 turns ON to ground terminal 43'a. Simultaneously with the production of the single pulse, a "high" level voltage signal is produced at terminal 56 of signal generation circuit 53a. The "High" level is maintained at least until a camera diaphragm aperture has been determined. The "High" level voltage signal from terminal 56 is applied through OR gate and terminal 44'a to the electronic flash device. After the diaphragm aperture has been determined automatically, the camera shutter is activated. When the shutter is fully opened, synchro switch 59 is closed. With the initiation of exposure by the opening of the shutter, integrator circuit 54 starts integrating photoelectric current commensurate with the intensity of the light reflected from the film surface being exposed, and produces a "High" level voltage when the integration value reaches a given level. The single pulse from terminal 55 of signal generator circuit 53a serves to determine the trigger timing of auxiliary flash tube 8, whereupon the "High" level voltage signal from terminal 56 determines the duration of the preliminary flash emission. The "High" level voltage from integrator circuit 54 serves to determine the interruption timing of the firing of main flash tube 9. In response to a "High" level voltage signal supplied from the electronic flash device through terminal 43'a, circuit 52 sets the shutter control circuit in the camera to provide a flash synchronizable shutter speed.

Figure 3:
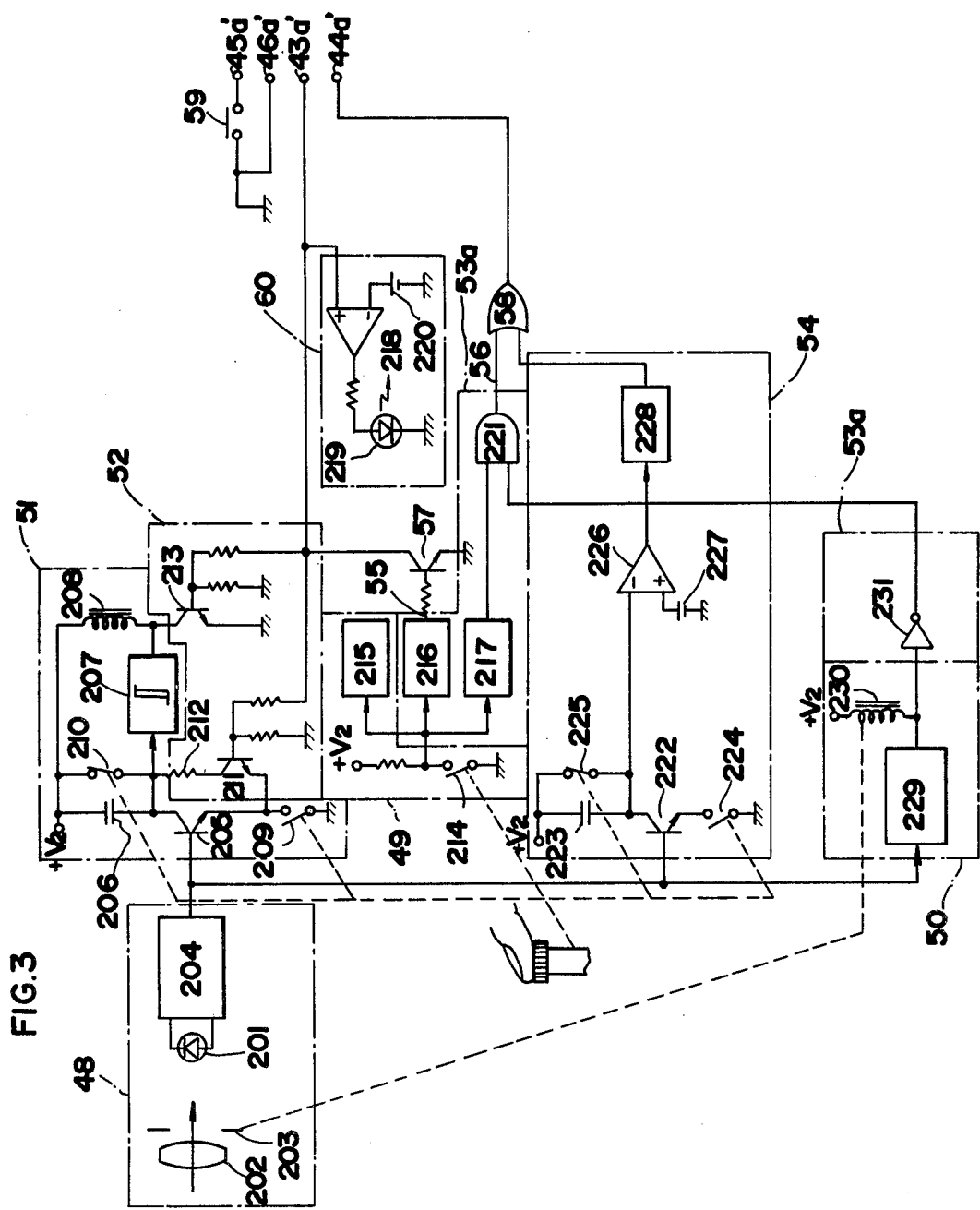
FIG. 3 is a circuit diaphragm of a camera circuit associated with the electronic flash device shown in FIG. 1.

FIG. 3 is a circuit diagram showing an example of a schematic of a definite camera circuit to be associated with the electronic flash device according to the present invention as shown in FIG. 1. The camera circuit generally comprises light measuring circuit 48, electromagnetic releasing circuit 49, diaphragm control circuit 50, shutter control circuit 51, flash synchronized shutter speed defining circuit 52, signal generator circuit 53a, integrator circuit 54 and charge completion indicating circuit 60.

Light measuring circuit 48 includes a photocell 201 disposed in the camera to receive the light from a scene being photographed (scene light) that passes through camera objective 202, the aperture of diaphragm 203 and is reflected from the film surface being exposed. Light measuring circuit 48 further includes a converter circuit 204 for converting the output of photocell 201 into a light measurement signal which is proportional to the logarithm of the scene light brightness. Photocell 201 has a sufficient spectral sensitivity not only for the visible light region but also for an ultrared region of light. Electromagnetic releasing circuit 49 is adapted to actuate conventional camera release mechanism 215 for initiating the camera photographic operation, in response to the closure of release switch 214 accompanied by the depression of a shutter release button.

Electromagnetic releasing circuit 49 is followed by signal generator circuit 53a including one-shot circuits 216 and 217, AND gate 221 and inverter 231. One-shot circuits 216 produces "High" level signals of a duration of 1 millisecond and one-shot circuit 217 produces a "High" level signal of a duration of 60 milliseconds respectively, simultaneously with the closure of release switch 214 which is closed in response to the depression of the shutter release button. It is to be understood that the output terminal of one-shot circuit 216 corresponds to terminal 55 in FIG. 1 and the output terminal of AND gate 221 corresponds to terminal 56 in FIG. 1.

Diaphragm control circuit 50 includes diaphragm control signal generator circuit 229 which inverts its output when receiving the intensity of light passed through the aperture of the diaphragm 203 of camera objective 202, which diaphragm is being stopped-down from a full to a minimum aperture initiated in accordance with the start of the operation of electromagnetic camera release mechanism 215, reaches a predetermined amount. Diaphragm control circuit 50 further includes diaphragm control electromagnet 230 which, in response to the inverted output of diaphragm control signal generation circuit 229, is energized for a short period to stop the stopping-down operation of the diaphragm. During this diaphragm control, a preliminary flash light is being emitted from auxiliary flash tube 8 in the electronic flash device and diaphragm 203 is controlled with the aid of the preliminary light emission. At this time, only the infrared rays emitted from auxiliary flash tube 8 are projected towards an object or scene to be photographed. On the other hand, main flash tube 9 is energized upon flash photography. In this case, both visible light and infrared rays are emitted from main flash tube 9 without being filtered. As photocell 201 has spectral sensitivity in both of the visible and infrared regions, the level of light energy received by the photocell changes in the case of the diaphragm control and of the flash photography. Hence, if the reference level in diaphragm control circuit is to be shifted in response to a charge completion signal from the electronic flash device, the change of the received light level will be compensated for.

Shutter control circuit 51 is of the type well-known in the art and is composed of logarithmic expansion transistor 205, integration capacitor 206 connected to the collector of the transistor 205, switching circuit 207 responsive to the charged voltage of the capacitor 206, shutter closure initiation electromagnet 208 controlled by switching circuit 207, and discharge switch 210 connected parallel to integration capacitor 206. Shutter control circuit 51 coacts with flash synchronized shutter speed defining circuit 52 including transistors 211 and resistor 212, and is arranged to define the shutter speed to a flash synchronizable value. Series connected resistor 212 and transistor 211 are connected between the emitter of transistor 205 and the collector thereof, and the resistance of resistor 212 is so selected as to provide, by the timer circuit composed of resistor 212 and integration capacitor, a flash synchronizable shutter speed, e.g. 1/60 second. Transistor 213 is connected in series with electromagnet 208 for initiating the shutter closure. In the construction described above, in a charge completion condition of the electronic flash device, when the shutter release button is depressed down to initiate an exposure operation and to close switch 209, a transistor 211 is turned ON, thereby, capacitor 206 is charged with the current flowing through resistor 212 and transistor 211. With this charging, capacitor 206 is charged up to the trigger or threshold level of switching circuit 207 quicker than the flash synchronizable shutter speed. Accordingly, unless transistor 213 is conductive switching circuit 207 produces a "High" level signal immediately after the closure of switch 209 to electromagnet 208. However, in the circuit embodiment of FIG. 3, electromagnet 208 is kept energized insofar as transistor 213 is kept conductive. When the electronic flash device emits the main flash light causing the charge completion signal to disappear, transistor 213 turns OFF to de-energize electromagnet 208 thereby initiating shutter closure.

Integrator circuit 54 for supplying a flash interruption signal to the electronic flash device, is composed of logarithmic expansion transistor 222, integration capacitor 223 connected to the collector of transistor 222, integration initiating switch 224, discharge switch 225 for capacitor 223, voltage comparator circuit 226, reference voltage generator 227 and one-shot circuit 228. When switch 224 is closed and switch 225 is opened in response to the initiation of an exposure, transistor 222 turns ON and integrator capacitor 223 is charged with a current corresponding to the output of the light measuring circuit 48. When the charged voltage level of capacitor 223 reaches a level given by reference voltage generator 227, the output of voltage comparator circuit 226 inverts to a "High" level signal. In response to the signal, one-shot circuit 228 produces a single pulse, which is transmitted through OR gate 58 and terminal 44'a to the electronic flash device to interrupt the main flash light emission. Voltage capacitor 218, light emitting diode 219 and reference voltage source 220 together form a conventional charge completion indicating circuit 60 which makes an indication in the camera viewfinder in response to a charge completion signal from the electronic flash device.

The following explanation is with reference to FIG. 2 which shows the construction of control circuit 37A provided in the electronic flash device of FIG. 1. First, an explanation will be given about charge completion signal generator circuit 125 which detects the voltage charged in main capacitor 4 of FIG. 1 and generates a charge completion signal when main capacitor 4 is charged up to a predetermined voltage level. One input 102 of voltage comparator circuits 101 is connected to junction 7 of FIG. 1 while the other input 103 is connected to junction 106 between resistors 104 and 105. The free end of resistor 104 is connected to reference voltage source 107, and the free end of resistor 105 is connected to the collector of transistor 108 which has its emitter grounded. Output 109 of voltage comparator circuit 101 is connected to an input of AND gate 110, and also to the base of transistor 108 through resistor 118. When the voltage applied to input 102 exceeds the voltage of reference voltage source 107, voltage comparator circuit 101 produces a "High" level voltage to turn ON transistor 108. With this turning-on, the potential at junction 106 is lowered by an amount corresponding to the voltage drop of resistor 104. Voltage comparator circuit 101 is arranged to operate with a hysteresis characteristics wherein once main capacitor 4 has been charged above a given value, voltage comparator 101 continues to produce a "High" level voltage until the charged voltage drops within a predetermined voltage range. Before synchro switch 59 of FIG. 1 is closed, buffer circuit 119 produces a "High" level voltage. Accordingly, under the charge completion state, AND gate 110 produces a "High" voltage. If the output of AND gate 110 inverts from a "High" to a "Low" level as described later, the output of buffer circuit 124 inverts from a "High" to a "Low" level after a lapse of a short time. The output terminal of buffer circuit 124 is connected to one input terminal 136 of AND gate 135.

The output terminal of buffer circuit 124 is also connected to one input terminal 143 of AND gate 141. Under the condition where the charging of the main capacitor 4 has been completed and before the closure of synchro switch 59, AND gate 141 receives a "High" level voltage at input terminal 143 and a "Low" level voltage at input terminal 144, to produce a "Low" level output. Output terminal 145 of AND gate 141 is connected to input terminal 148 of one-shot circuit 147 which produces a "High" level voltage output for a given period, e.g. 16 milliseconds in response to a "High" level voltage input. One-shot circuit 147 normally produces a "Low" level voltage output and the output is inverted by inverter 150 to a "High" level voltage which in turn is applied to one input terminal 137 of AND gate 135. Thus, when main capacitor 4 is charged up to the given value, AND gate 135 receives "High" level voltages from both of its input terminals, therefore AND gate 135 produces a "High" level voltage output, which in turn is applied to one input terminal 152 of AND gate 151 and is also supplied, as the charge completion signal, through resistor 155 and terminal 43a to camera circuit 52. Terminal 43a connected with one end of resistor 155, is connected through inverter 156 to the other input 153 of AND gate 151. Under the condition of charge completion before the shutter release operation, AND gate 151 receives, at its input terminal 153, a "Low" level voltage from inverter 156 and produces a "Low" level voltage output. Output terminal 154 of AND gate 151 is connected to one input terminal 158 of AND gate 157 and is also connected to input terminal 163 of one-shot circuit 162 which is constructed to generate a "High" level voltage pulse for a given period in response to a "High" level voltage input thereof. The duration of the "High" level voltage pulse from one-shot circuit 162 is determined to cover the time from the starting of a shutter release operation to the completion of a diaphragm control operation, and has a value e.g. 60 milliseconds. Output terminal 164 of one-shot circuit 162 is connected to one input terminal 185 of AND gate 184 to limit the duration of the preliminary flash light emission for the longest period. AND gate 157 has its other input terminal 159 connected with external terminal 44a. AND gate 157 generates a "High" level voltage output if signal generator circuit 53a outputs "High" level voltage signals from output terminals 55 and 56. The "High" level voltage output of AND gate 157 is applied through OR gate 165 and terminal 40a to the gate of thyristor 20 in FIG. 1, to activate trigger circuit 23. At this time, the "High" level voltage supplied from one-shot circuit 162, is applied through terminal 41a and resistor 35 in the circuit of FIG. 1 to the base of transistor 34 to turn transistor 24 ON, thereby keeping thyristor 24 OFF so that the main flash tube is not fired.

Phototransistor 174 is disposed to directly receive the infrared rays emitted from auxiliary flash tube 8 and having passed through filter 16, the infrared rays entering phototransistor 174 without being projected to and reflected from an object to be photographed. The photoelectric output current of photoresistor 174 is supplied to resistor 176 and converted thereby to a voltage signal, which in turn is applied to positive input terminal 179 of voltage comparator circuit 178. When the voltage signal exceeds the voltage of reference voltage source 182, the output voltage of voltage comparator circuit 178 inverts from a "Low" to a "High" level, which in turn is applied through inverter 183 to input terminal 187 of AND gate 184. Output terminal 188 of AND gate 184 is connected through terminal 39a and resistor 14 in FIG. 1 to the base of transistor 11.

An operation of the electronic flash device constructed as described above is now described hereinbelow. Assume that the electronic flash device is coupled to the camera. When power switch 2 of the electronic flash device is closed, booster circuit 1 starts to operate and charge capacitor 4 with the boosted voltage. When the charged voltage reaches the given level, voltage comparator circuit 101 shown in FIG. 2 produces a "High" level voltage output. In response to this output, AND gate 135 produces at its output a "High" level voltage output which is applied, as the charge completion signal, through terminal 43a to camera circuit 52. In the camera body, in response to the charge completion signal, an indication of the charge completion is made in the view finder and exposure is made with a flash synchronizable shutter speed.

When the shutter release button shown in FIG. 3 is depressed down and shutter release is commanded, signal generator circuit 53a in the camera body at first produces a "High" level voltage for 1 milli-second at its output terminal 55 to turn ON transistor 57 and grounds terminal 43'a shown in FIG. 1 temporarily. At the same time, a "High" level voltage is generated from output terminal 56 until a diaphragm aperture is determined. Due to the grounding of terminal 43'a, AND gate 151 shown in FIG. 2 receives "High" level voltages at both input terminals to produce a "High" level voltage signal, which is applied through AND gate 157, OR gate 165 and terminal 40a to the gate of thyristor 20 of FIG. 1 to activate trigger circuit 23.

Referring back to FIG. 2, "High" level voltage signal from AND gate 151 triggers one-shot circuit 162 which generates a "High" level voltage output for a given period. AND gate 184 receives at its input terminal 185 a "High" level voltage from one-shot circuit 162, at its input terminal 186 a "High" voltage from the camera through terminal 44a, and at its input terminal 187 a "High" voltage from inverter 183 since voltage comparator circuit 178 generates a "Low" level voltage in the initial stage. AND gate 184 thereby generates a "High" level voltage output, which turns ON transistors 11 and 12 (see FIG. 1) through terminal 39a. Thus, due to the activation of trigger circuit 23, auxiliary flash tube 8 is fired and a preliminary flash light emission with infrared rays is commenced with visible light being blocked by filter 16. When the intensity of the preliminary light attains a given value after the commencement of the preliminary flash light emission, the output voltage of voltage comparator circuit 178 inverts from a "Low" to a "High" level whereby AND gate 184, receiving a "LOW" level voltage at its input terminal 187, generates a "Low" level voltage to turn OFF transistors 11 and 12. With the turning OFF of the transistors, the discharge of main capacitor 4 is interrupted, but auxiliary flash tube 8 does not stop its light emission immediately since the magnetic energy stored in coil 10 is converted into electric energy. However, the intensity of the emitted light decreases so that voltage comparator circuit 178 generates a "Low" level voltage output again. Then, AND gate 184 generates a "High" level voltage output to turn ON transistors 11 and 12 to enable the discharge of main capacitor 4 thereby increasing the intensity of the light emitted from auxiliary flash tube 8 until the intensity reaches the given value to cause the interruption of the discharge of main capacitor 4. Then, a similar operation is repeated. As the cycle of the repeating is made for example about $100\mu$ seconds, the preliminary light may be considered as being emitted as substantially constant in view of the order of the period required for the diaphragm aperture control. While auxiliary flash tube 8 is emitting light, diaphragm 203 in the camera is stopped-down until the light measurement value for the light infrared rays reflected from an object to be photographed and traversing the diaphragm aperture reaches a given level to cause the interruption of the stopping down thereby determining the diaphragm aperture. Simultaneously with the diaphragm aperture determination, the voltage at output terminal 188 of AND gate 184 becomes a "Low" level to stop the preliminary flash light emission.

Subsequently, after a lapse of time, e.g. 100 milliseconds from the commencement of the preliminary flash light emission, the camera shutter is opened fully so that synchro switch 59 is closed to trigger main flash tube 9. The following is a description of that triggering operation. Although the charged voltage of main capacitor 4 is reduced to some extent, e.g. 1/10 of the charge completion voltage by the preliminary flash light emission, a sufficient amount of voltage for the main flash light emission remains in the main capacitor 4, with voltage comparator circuit 101 continuing to generate a "High"

level voltage due to the operation of the hysteresis circuit.

When synchro switch 59 is closed, buffer circuit 119, receiving a "Low" level voltage at its input terminal 45a, generates a "Low" level voltage output, which is applied to AND gate 110 and inverter 140, whereby the output of inverter 140 inverts to a "High" level immediately, while the output of AND gate 110 inverts to a "Low" level after a short delay because of delay capacitor 123 connected thereto. Accordingly, AND gate 141 receives "High" level voltages at both input terminals when the output of inverter 140 is at a "High" level, and receives a "Low" level voltage only at input terminal 143 after a lapse of a short time therefrom. As a result, AND gate 141 generates a "High" level single pulse for a short duration of time while receiving "High" level voltages at both of its input terminals 143 and 144, and triggers one-shot circuit 147 which generates a "High" level voltage output. The "High" level voltage output of one-shot circuit 147 is applied through OR gate 165 and terminal 40a to trigger circuit 23 which in turn triggers main flash tube 9. At this time, the output of one-shot circuit 162 has become a "Low" level voltage to turn OFF transistor 34 shown in FIG. 1. Therefore, thyristor 24 is kept ON, whereby main flash tube 9 starts to emit light, being triggered by trigger circuit 23. In the camera, integrator circuit 54 monitors the light reflected from the film being exposed. When the monitored light amount reaches a given value, a "High" level voltage is applied through terminal 44'a to input terminal 171 of AND gate 169. As the other input terminal 170 of AND gate 169 is applied with a "High" level voltage from one-shot circuit 147 in response to the closure of synchro switch 59, AND gate 169 generates a "High" level voltage output which turns ON thyristor 25 through terminal 42a and turns OFF thyristor 24 that is connected in series with the main flash tube 9, thereby interrupting the light emission of main flash tube 9.

The embodiment described above is applied to a camera wherein the diaphragm aperture is automatically controlled in accordance with a scene light intensity which is measured through the diaphragm aperture being stopped down and is constructed so that the intensity of the preliminary flash light is maintained substantially constant over its light emission period for the control of the camera diaphragm aperture. However, the application of the present invention is not limited to that type, but may be arranged so that the preliminary flash light emission is effected with its light intensity changing in accordance with a normal discharged flash light characteristic curve, and that in accordance with the total integration of the flash light reflected from an object to be photographed, i.e. the amount of the reflected light integrated till the termination of the preliminary flash light emission, the camera diaphragm aperture may be automatically adjusted or the camera-to-object distance may be detected. In this case, the total amount of the preliminary light must be kept constant.

Figure 4:
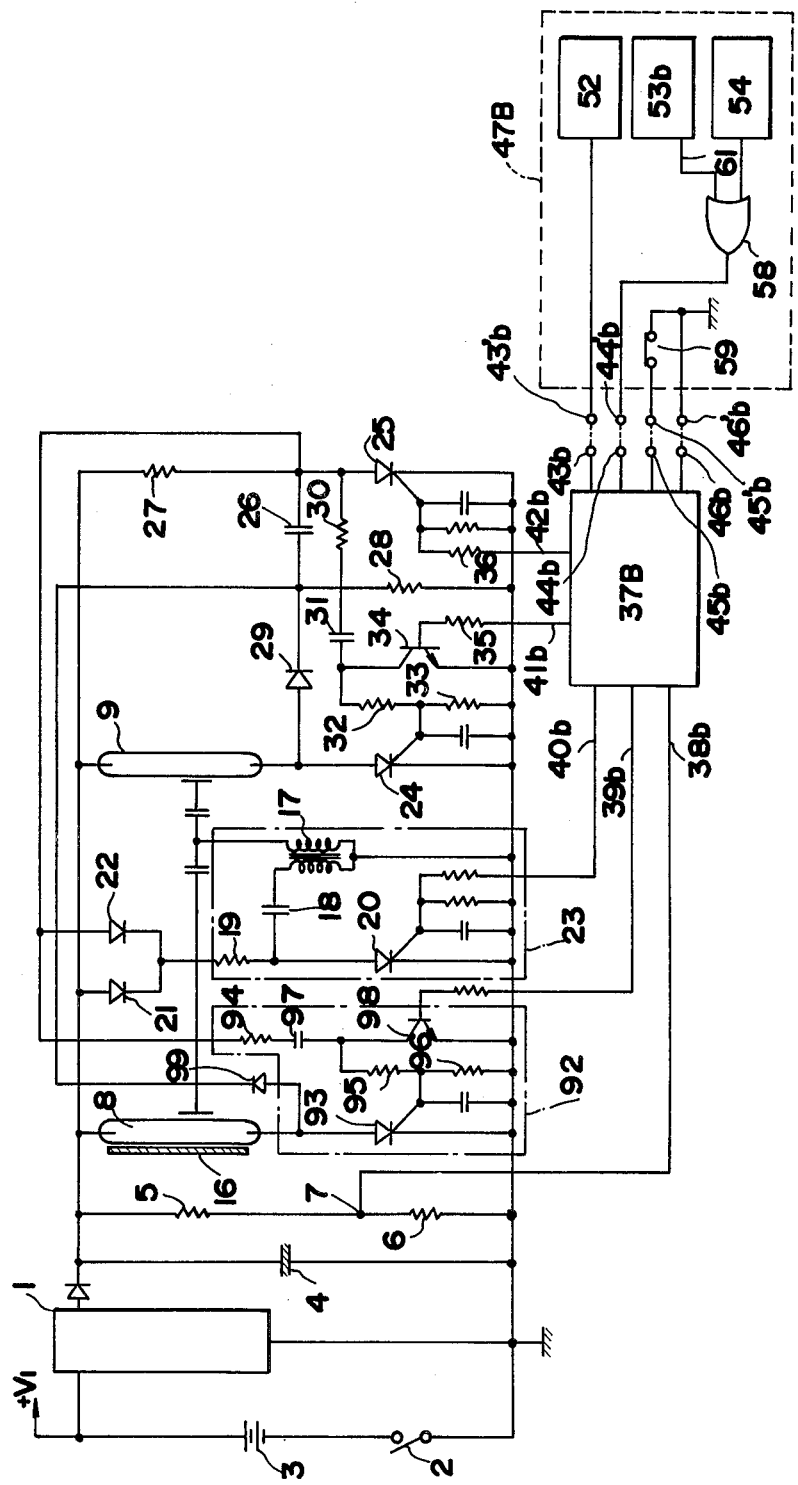
FIG. 4 is a circuit diagram showing another embodiment of the electronic flash device according to the present invention.

The following is a description of an electrical circuit schematic of an electronic flash device that emits preliminary flash light with normal discharged flash light characteristics. In FIG. 4, the same reference numerals are designated to the elements corresponding or similar to those of the above embodiment and detailed description thereof is omitted.

With reference to FIG. 4, the commencement of light emission of auxiliary flash tube 8 is controlled by circuit 92 which includes thyristor 93, resistors 94, 95 and 96, capacitor 97 and transistor 98. Additionally, auxiliary flash tube 8 and main flash tube 9 are interrupted in their light emission respectively at different times through diodes 99 and 29 by a common light interruption circuit including thyristor 25, capacitor 26 and resistor 28. It should be understood that the time interval from a preliminary flash light emission to a main flash light emission is comparatively short, e.g. 100 milliseconds, and the time constant given by resistors 27 and 28 and capacitor 26 are selected to correspond to the time interval. Transistors 98 and 34 are controlled such that when preliminary flash tube 8 is fired, thyristor 93 is turned ON and thyristor 24 is turned OFF, while thyristor 93 is turned OFF and thyristor 24 is turned ON when main flash tube 9 is fired. Control circuit 37B has a construction corresponding to control circuit 37A in FIG. 1, and connected to later-to-be-described camera circuit 47B through terminals 43b, 44b, 45b and 46b.

Figure 5:
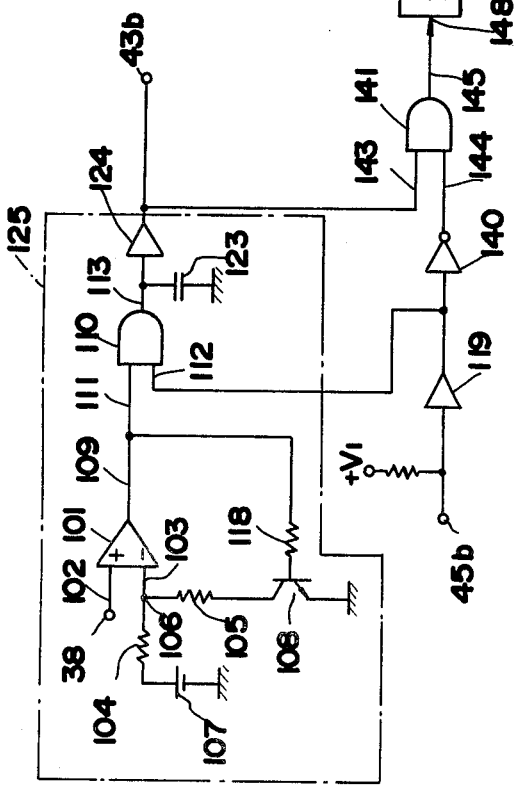
FIG. 5 is a circuit diagram showing a definite construction of the control circuit (37B) in FIG. 4.

A definite circuit construction of control circuit 37B is shown in FIG. 5, wherein the circuit elements having the same functions or constructions as those of control circuit 37A in FIG. 2 are designated by the same reference numerals so explanation of them has been omitted. The output terminal of charge completion signal generator circuit 125 is directly connected with terminal 43b. The ON-OFF signal of synchro switch 59 is directly applied, through one shot circuit 147 and inverter 150, to terminal 41b and input terminal 158 of AND gate 157. Preliminary light monitoring circuit includes phototransistor 190, integration capacitor 191, comparator 193 and reference voltage generator 194. These are associated such that integration capacitor 191 integrates the output current of phototransistor 190 directly monitoring the preliminary light emitted from auxiliary flash tube 8. This is so that when the integration attains a given reference value, a preliminary flash light interruption signal is generated through OR gate 196 which is connected between AND gate 169 and terminal 42b. The given reference value is determined such that the amount of the charge distributing to the preliminary flash light is less than a given amount, for example, one tenth of the whole charge of the main capacitor having been charged. Terminal 39b is applied with the output of AND gate 157 through inverter 195. Transistor 192 is parallelly connected with integration capacitor 191. Turning ON or OFF of transistor 192 is controlled by output of inverter 195 such that transistor 192 is turned off only for the period of the preliminary flash light emission and serves as a discharge switch for capacitor 191. In camera circuit 47b shown as enclosed by a broken line in FIG. 4, signal generator circuit 53b generates, in response to shutter release operation, at its terminal 61a a single pulse of the duration, e.g. 16 milliseconds, required for the preliminary flash light emission. Flash synchronizable shutter speed providing circuit 52 and integrator circuit 54 have the same arrangements as those of the above mentioned embodiment, so their description is omitted here.

The general operation of the embodiment constructed as described above will be explained herein after. Assume that the electronic flash device is coupled with the camera. When power switch 2 in FIG. 4 is closed, booster or DC-DC converter circuit 1 starts its operation to charge capacitor 4 with its high output voltage. When the charged voltage reaches a given value, voltage comparator circuit 101 in FIG. 5 generates a "High" level voltage, in response to which buffer circuit 124 generates a "High" level voltage which is supplied, as a charge completion signal, to camera circuit 52 through terminal 43b. In this camera, upon receipt of the charge completion signal, an indication of the charge completion is made in the view finder, and exposure is made with a flash synchronizable shutter speed in response to a shutter release operation. When the shutter release button is depressed to command the shutter release, a single pulse of a "High" level voltage of a given duration is generated at terminal 61 of signal generator circuit 53b in the camera which circuit has the same construction as that of signal generator circuit 53a in FIGS. 1 and 2. As synchro switch 59 is left open, the single pulse is applied through AND gate 157, OR gate 165 and terminal 40b to the gate of the thyristor 20 to activate trigger circuit 23. At this time, transistor 34 is conductive due to the "High" level voltage signal from terminal 41b, while transistors 98 and 192 are nonconductive due to the "Low" level voltage applied through AND gate 157 and inverter 195. Thus, of thyristors 24 and 93, thyristor 93 is conductive. Accordingly, by the activation of trigger circuit 23, auxiliary flash tube 8 is fired and a preliminary flash emission of infrared rays is commenced with visible light being cut off by filter 16. Integrator capacitor 191 integrates the output current of phototransistor 190 which is directly monitoring the light emission of auxiliary flash tube 8. When the integration reaches a predetermined value given by reference voltage source 194, the output of voltage comparator circuit 193 inverts from a "Low" to a "High" level voltage. This is applied through OR gate 196 and terminal 42b to the gate of thyristor 25 to turn ON the latter. With the conduction of thyristor 25, the light interruption circuit operates to turn OFF thyristor 93 through diode 99, thereby interrupting the preliminary flash light emission by means of auxiliary flash tube 8.

Subsequently, when the shutter is opened and reaches its full opening condition, for example, 100 milliseconds after the preliminary flash light emission, synchro switch 59 is closed to cause the triggering of main flash tube 9. Although the charged voltage of main capacitor 4 is reduced by the preliminary flash light emission by some amount from the voltage at the time of charge completion, e.g. by one tenth of the voltage, a charge sufficient for the main flash emission is left in the capacitor. Voltage comparator circuit 101 remains to continuously generate a "High" level voltage because of the hysteresis circuit. When synchro switch 59 is closed, buffer circuit 119, being applied with a "Low" level voltage at its input terminal 45b, generates a "Low" level voltage output which is applied to AND gate 110 and inverter 140. Although the output of inverter 140 instantaneously inverts to a "High" level voltage, the input of buffer 124, which is connected with capacitor 123, inverts to a "Low" level voltage after a short delay. This is to invert output of the buffer 124 to a "Low" level voltage. Accordingly, AND gate 141 receives "High" level voltages at both its input terminals 143 and 144, at the time when the output of inverter 140 inverts to a "High" level voltage. Then it receives a "Low" level voltage at its input terminal 143 after a short time delay. As a result, AND gate 141 generates a "High" level voltage single pulse for this short time while "High" level voltages are applied to both input terminal 143 and 144, and triggers one-shot circuit 147. The "High" level voltage generated from one-shot circuit 147 in this manner, is applied through OR gate 165 and terminal 40b to trigger circuit 23 to trigger main flash tube 9. At this time, terminal 41b is made at a "Low" level state through inverter 150 and transistors 98 and 192 are turned ON through inverter 150, AND gate 157 and inverter 195. Consequently, thyristor 24 becomes conductive, and main flash tube 9 starts to emit light by the triggering operation of trigger circuit 23. However, the auxiliary flash tube 8 cannot emit light since thyristor 93 is not turned ON by the conduction of transistor 98. In the camera, the amount of the light reflected from the film being exposed is monitored by integrator circuit 54. When the integration reaches a given level, a "High" level voltage signal is applied through terminal 44'b to input terminal 171 of AND gate 169. As the other input terminal 170 of AND gate 169 is applied with a "High" level voltage from the one shot circuit 147 in response to the closure of synchro switch 59, AND gate 169 generates a "High" level voltage signal. This turns ON thyristor 25 through OR gate 196 and terminal 42b by turning OFF of thyristor 24 through diode 29, thereby interrupting the light emission of the main flash tube 9.

As the present embodiment is arranged to emit infrared rays toward an object to be photographed upon firing of auxiliary flash tube 8 as in the previous embodiment, the detector (not shown) in the camera for receiving the infrared rays for the automatic camera diaphragm adjustment and/or the camera-to-object distance detection must have a spectral sensitivity at least in the infrared region. Silicon (Si), generally used as a semiconductive material, has a spectral sensitivity not only in the visible light region but in the infrared red region. Accordingly, when a silicon photodiode is employed as the light receiving or photocell element, it is not necessary to provide another photocell for the detection of infrared rays.

Further, photocells 174 and 190 employed for monitoring the preliminary light emission need not necessarily have sensitivity in the infrared region, but may be a GaAsP cell or GaP cell having spectral sensitivity in the visible light region. This is because the ratio of visible light and infrared ray components in the light emitted from Xenon tube is fixed and the infrared component can be measured by monitoring the visible light.

The electronic flash device, making use of a Xenon tube emitting not only visible light but also infrared rays, is arranged to emit the invisible light, i.e. infrared rays for the preliminary light emission. Thus the person to be photographed is not stimulated by the preliminary light emission to begin to close their eyes.

What is claimed is:

1. A photographic system for use in flash photography with a camera which contains an objective lens having a diaphragm, a shutter mechanism and a synchro switch for flash photography, comprising:
   means for emitting, in advance of main flash light emission for flash photography, preliminary flash light having at least infrared light components and including a filter for substantially blocking light components other than said infrared light components to transmit substantially only said infrared light components;
   means for emitting main flash light having at least visible light components;
   means for receiving preliminary flash light reflected from an object to be photographed;
   means for determining the aperture of said diaphragm in accordance with the light received by said receiving means;

means for starting light emission from said means for emitting preliminary flash light in response to starting of a shutter release operation of said camera; and means for starting light emission from said means for emitting main flash light upon operation of said synchro switch.

2. A photographic system as claimed in claim 1, further comprising means for controlling the light intensity of said means for emitting preliminary flash light such that the light intensity therefrom is substantially constant over a given time period.

3. A photographic system as claimed in claim 2, further comprising means for storing electrical energy for firing said means for emitting preliminary flash light, and wherein said preliminary flash light intensity controlling means includes means for monitoring the light intensity of said means for emitting preliminary flash light, means for comparing said monitored light intensity with a predetermined light intensity, and means for controlling said electrical energy stored in said storing means in response to the compared result from said means for comparing.

4. A photographic system as claimed in claim 3, wherein said diaphragm aperture determining means includes means for stopping-down said diaphragm from maximum aperture to minimum aperture and the operation thereof initiated in accordance with said shutter release operation, and means for interrupting the stopping-down of said diaphragm when the light intensity received by said preliminary flash light receiving means reaches a predetermined intensity.

5. A photographic system as claimed in claim 4, further comprises means for stopping the light emission of said preliminary flash light emitting means when the stopping-down of said diaphragm is interrupted by said interrupting means.

6. A photographic system as claimed in claim 1 wherein said means for starting light emission from said means for emitting preliminary flash light operates in response to operation of a shutter release button of said camera.

7. A photographic system as claimed in claim 1 wherein said means for emitting main flash light includes a first Xenon discharge tube and said means for emitting preliminary flash light includes a second Xenon discharge tube.

8. A photographic system as claimed in claim 1, further comprising means for directly receiving light emitted from said means for emitting preliminary flash light without reflection from an object to be photographed, means for integrating the light received by said means for directly receiving light, means for comparing the integrated amount of light with a predetermined amount of light, and means for stopping the light emission from said means for emitting preliminary flash light when the integrated light amount reaches said predetermined light amount.

9. A photographic system for use in flash photography with a camera adapted to emit preliminary flash light toward an object to be photographed in advance of main flash light emission for flash photography, comprising:

means for emitting preliminary flash light having at least infrared light components, and including means for blocking light components other than said infrared light components to transmit substantially only said infrared light components;

means for emitting main flash light having at least visible light components; and means for storing electrical energy for said preliminary flash light emission and said main flash light emission.

10. A photographic system as claimed in claim 9, wherein said means for emitting preliminary flash light includes a Xenon discharge tube which emits both visible light and infrared light components, and said means for blocking light components includes a filter for transmitting substantially only infrared light components.

11. A photographic system as claimed in claim 10, wherein said means for emitting main flash light includes a Xenon discharge tube.

12. A photographic system as claimed in claim 9, further comprising means for controlling the light intensity of said means for emitting preliminary flashlight such that said light intensity is substantially constant over a given time period.

13. A photographic system as claimed in claim 12, wherein said means for controlling light intensity includes means for monitoring the light intensity of said means for emitting preliminary flash light, means for comparing said monitored light intensity with a predetermined light intensity, and means for controlling the electrical energy stored in said means for storing in response to the compared results of said means for comparing.

14. A photographic system as claimed in claim 9, further comprising means for starting light emission from said means for emitting preliminary flash light and means for starting light emission from said means for emitting main flash light.

15. A photographic system as claimed in claim 14, further comprising means for triggering the starting of light emission from both said means for emitting preliminary flash light and said means for emitting main flash light, means for prohibiting light emission from said means for emitting preliminary flash light, and means for prohibiting light emission from said means for emitting main flash light.

16. A photographic system as claimed in claim 15, wherein said triggering means includes a triggering capacitor for storing electrical energy for actuating said means for emitting preliminary flash light and said means for emitting main flash light, and wherein said photographic system further comprises means for recharging said triggering capacitor after said means for emitting preliminary flash light is actuated such that said triggering capacitor is charged for actuating said means for emitting main flash light.

17. A photographic system as claimed in claim 14, further comprising means for actuating said means for starting light emission from said means for emitting preliminary flash light in response to a shutter release operation of said camera, and means for actuating said means for starting light emission from said means for emitting main flash light in response to closure of a synchro switch of said camera.

18. A photographic system as claimed in claim 17, wherein said means for actuating said means for starting light emission from said means for emitting preliminary flash light operates in response to operation of a shutter release button of said camera.

19. A photographic system as claimed in claim 9, further comprising means for receiving light emitted from said means for emitting preliminary flash light without reflection from an object to be photographed, means for integrating the light received by said receiving means, means for comparing the integrated light amount with a predetermined light amount, and means for stopping the light emission of said means for emitting preliminary flash light when said integrated light amount reaches said predetermined light amount.

20. In a photographic system for use in flash photography, an electronic flash device adapted to be coupled with a camera including a shutter release button and a synchro switch, said electronic flash device comprising;
   a first terminal for receiving a first signal for actuating main flash light emission in response to the operation of said synchro switch;
   a second terminal for receiving a second signal for actuating preliminary flash light emission in response to the operation of said shutter release button;
   means for emitting main flash light which contains visible light components in response to said first signal; and
   means for emitting preliminary flash light emission including at least infrared light components in response to said second signal, and a filter located adjacent said means for emitting preliminary flash light for blocking light components other than said infrared light components such that said filter transmits substantially only infrared light components.

21. In a photographic system as claimed in claim 20, wherein said means for emitting preliminary flash light and said means for emitting main flash light each include a Xenon discharge tube emitting both infrared and visible light components.

22. An electronic flash device adapted for use with a camera for flash photography, comprising;
   means for emitting, in advance of main flash light emission for flash photography, preliminary flash light having at least infrared light components, and a filter for substantially blocking light components other than said infrared light components to transmit substantially only said infrared light components;
   means for emitting main flash light having visible light components;
   means for receiving preliminary flash light reflected from an object to be photographed;
   means for initiating light emission from said means for emitting preliminary flash light in response to a signal representing shutter release operation of a camera, the electronic device being adapted to receive said signal; and
   means for initiating light emission from said means for emitting main flash light in response to another signal representing camera synchro switch operation, the electronic device being adapted to receive said another signal.

23. An electronic flash device as claimed in claim 22, further comprising means for controlling the light intensity of said means for emitting preliminary flash light such that the light intensity therefrom is substantially constant over a given time period.

24. An electronic flash device as claimed in claim 23, further comprising means for storing electrical energy for firing said means for emitting preliminary flash light, and wherein said preliminary flash light intensity controlling means includes means for monitoring the light intensity of said means for emitting preliminary flash light, means for comparing said monitored light intensity with a predetermined light intensity, and means for controlling said electrical energy stored in said storing means in response to the compared result from said means for comparing.

25. An electronic flash device as claimed in any one of claims 22, 23, or 24, further comprising means for directly receiving light emitted from said means for emitting preliminary flash light without reflection from said object to be photographed, means for integrating the light received by said means for directly receiving light, means for comparing the integrated amount of light with a predetermined amount of light, and means for terminating the light emission from said means for emitting preliminary flash light when the integrated light amount reaches said predetermined light amount.

26. An electronic flash device as claimed in any one of claims 22, 23, or 24, wherein said means for emitting preliminary flash light and said means for emitting main flash light each includes a Xenon discharge tube for emitting visible light and infrared light components, and said filter is located adjacent said Xenon discharge tube in said means for emitting preliminary flash light.

27. An electronic flash device adapted for use with a camera for flash photography, comprising:
   means for emitting preliminary flashlight having at least infrared light components, and including means for substantially blocking light components other than said infrared light components to transmit substantially only said infrared light components;
   means for emitting main flash light having at least visible light components; and
   means for storing electrical energy for said preliminary flash light emission and said main flash light emission.

28. An electronic flash device as claimed in claim 27, wherein said means for emitting preliminary flash light includes a Xenon discharge tube which emits both visible light and infrared light components, and said means for substantially blocking light components includes a filter for transmitting substantially only infrared light components.

29. An electronic flash device as claimed in claim 28, wherein said means for emitting main flash light includes a Xenon discharge tube.

30. An electronic flash device as claimed in claim 27, further comprising means for controlling the light intensity of said means for emitting preliminary flash light such that said light intensity is substantially constant over a given time period.

31. An electronic flash device as claimed in claim 30, wherein said means for controlling light intensity includes means for monitoring the light intensity of said means for emitting preliminary flash light, means for comparing said monitored light intensity with a predetermined light intensity, and means for controlling the electrical energy stored in said means for storing in response to the compared results of said means for comparing.

32. An electronic flash device as claimed in claim 27, further comprising means for initiating light emission from said means for emitting preliminary flash light and means for initiating light emission from said means for emitting main flash light.

33. An electronic flash device as claimed in claim 32, further comprising means for triggering the initiation of light emission from both said means for emitting preliminary flash light and said means for emitting main flash light, means for prohibiting light emission from said means for emitting preliminary flash light, and means for prohibiting light emission from said means for emitting main flash light.

34. An electronic flash device as claimed in claim 33, wherein said triggering means includes a triggering capacitor for storing electrical energy for actuating said means for emitting preliminary flash light and said means for emitting main flash light, and wherein the electronic flash device further comprises means for recharging said triggering capacitor after said means for emitting preliminary flash light is actuated such that said triggering capacitor is charged for actuating said means for emitting main flash light.

35. An electronic flash device as claimed in claim 32, further comprising means for actuating said means for initiating light emission from said means for emitting preliminary flash light in response to a shutter release operation of the camera, and means for actuating said means for emitting main flash light in response to a signal representative of closure of a synchro switch of a camera adapted to be operatively connected with the electronic flash device.

36. An electronic flash device as claimed in claim 35, wherein said means for actuating said means for initiating light emission from said means for emitting preliminary flash light operates in response to operation of a shutter release button of the camera.

37. An electronic flash device as claimed in claim 26, further comprising means for receiving light emitted from said means for emitting preliminary flash light without reflection from an object to be photographed, means for integrating the light received by said receiving means, means for comparing the integrated light amount with a predetermined light amount, and means for terminating the light emission of said means for emitting preliminary flash light when said integrated light amount reaches said predetermined light amount.

38. An electronic flash device adapted to be coupled with a camera capable of generating a first signal representative of operation of a synchro switch and a second signal representative of shutter release operation, comprising:
a first terminal for receiving said first signal;
a second terminal for receiving said second signal;
means for emitting main flash light having at least visible light components in response to said first signal;
means for emitting preliminary flash light emission having at least infrared light components in response to said second signal, and including a filter located adjacent said means for emitting preliminary flash light for substantially blocking light components other than said infrared light components such that said filter substantially transmits onlyinfrared light components.

* * * * *